United States Patent [19]

Strehlow

[11] Patent Number: 4,462,520

[45] Date of Patent: Jul. 31, 1984

[54] RETRACTABLE SKIRT GATE

[76] Inventor: Robert W. Strehlow, 12912 W. Prospect Dr., New Berlin, Wis. 53157

[21] Appl. No.: 405,291

[22] Filed: Aug. 4, 1982

[51] Int. Cl.³ .............................................. B65G 47/19
[52] U.S. Cl. ................................... 198/525; 198/532; 198/836
[58] Field of Search ................ 198/525, 530, 532, 836

[56] References Cited

U.S. PATENT DOCUMENTS 1,925,990  9/1933  Pampel ............................... 198/532
2,603,342  7/1952  Martinson ........................... 198/532

Primary Examiner—Joseph E. Valenza
Assistant Examiner—Kyle E. Shane
Attorney, Agent, or Firm—George A. Evans, Sr.

[57] ABSTRACT

A skirt assembly and swinging gate are both pivotally mounted on a bin hopper. The gate carries a cam which engages a follower on the skirt assembly. When the gate is closed, a notch in the cam face lifts the follower arm and the skirting assembly to its most elevated position. The final lifting action occurs while the gate is over-travelling its effective closed position. When it is desired to open the gate, the cam action is reversed until the skirt reaches sealing position; further engagements of the skirt assembly on the belt is prevented by a stop on the skirt which engages the hopper and operates with the cam face to lock the skirt in the exact position desired. It is held in this position during subsequent gate opening and regardless of the degree to which the gate is opened.

8 Claims, 6 Drawing Figures

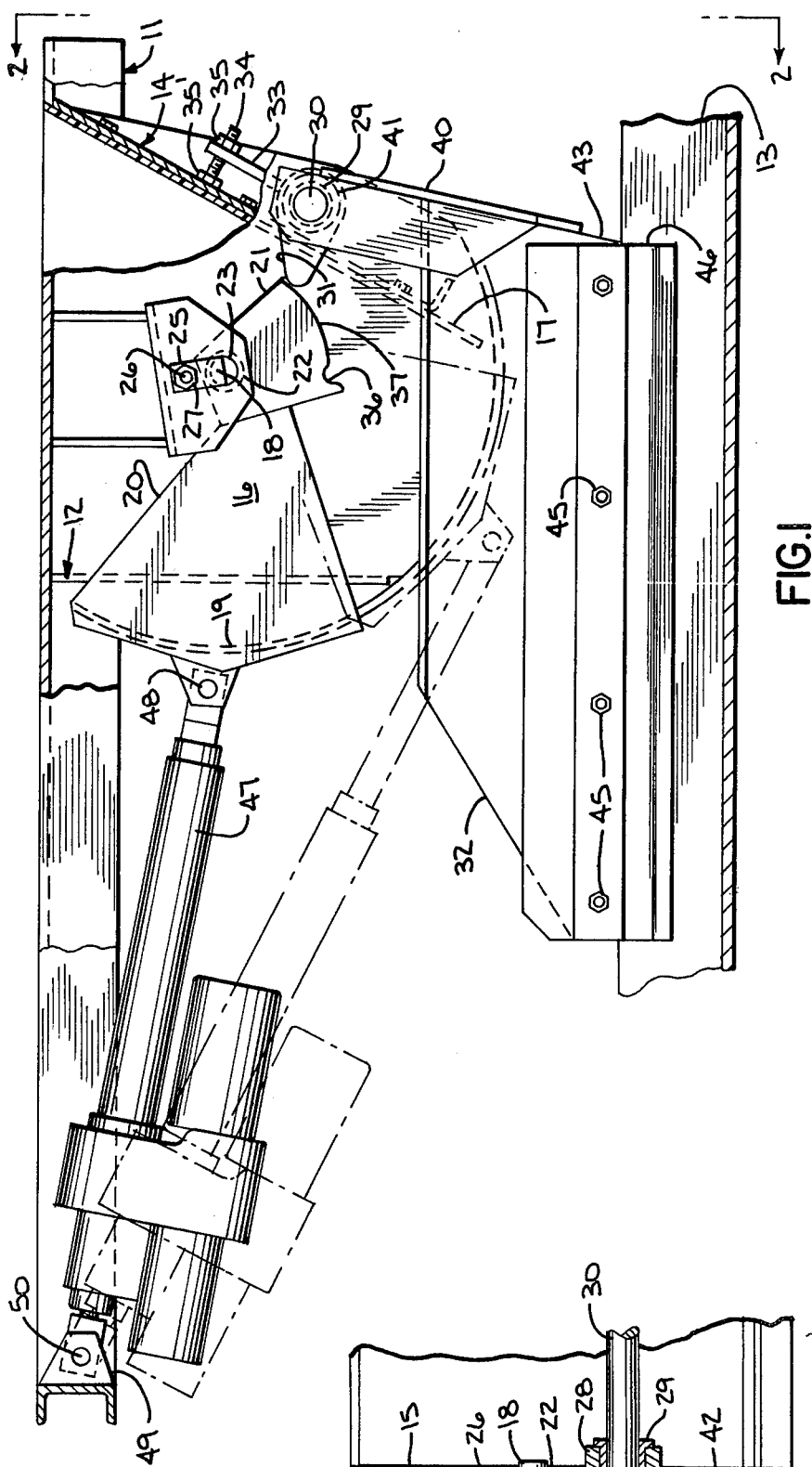

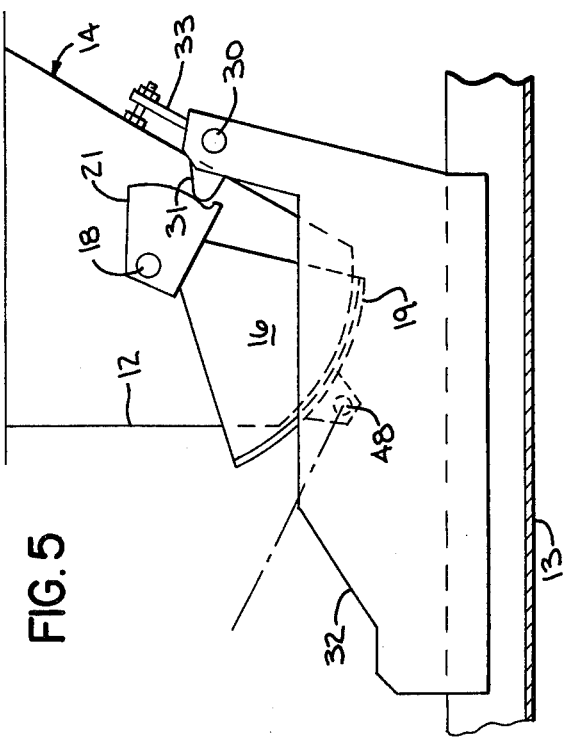
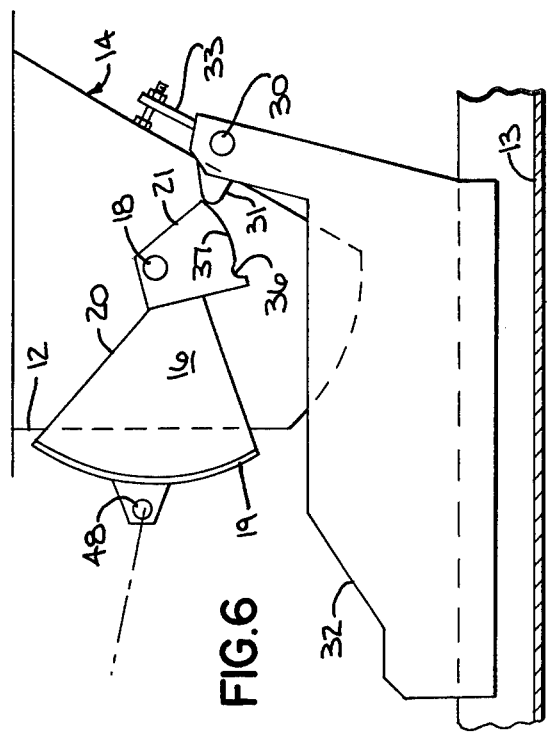
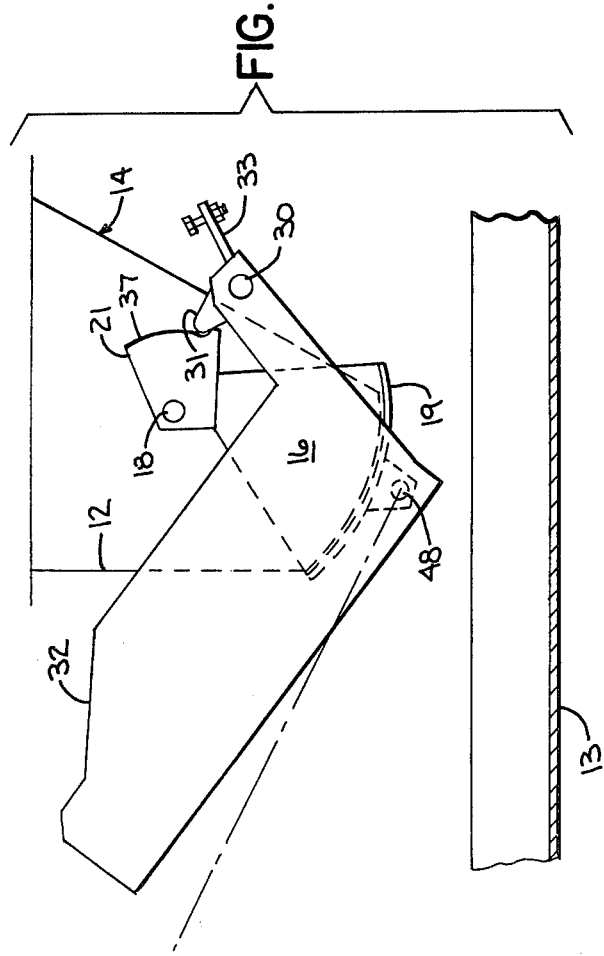
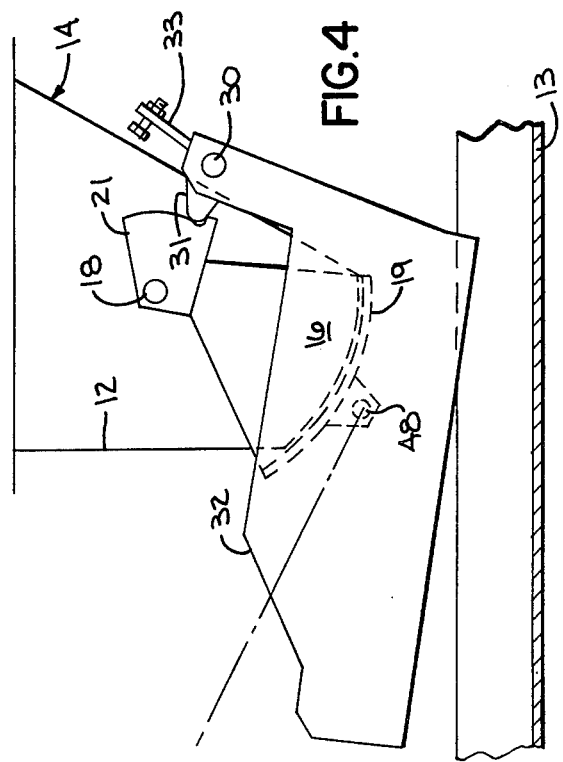

4,462,520

RETRACTABLE SKIRT GATE

SUMMARY OF THE INVENTION

Belt conveyers are frequently used to convey bulk material such as sand and other flowable materials from bins or storage piles arranged above the path travelled by the conveyer. These bins or piles generally have inwardly tapered discharge hoppers, the flow through which is controlled by gates usually of clamshell shape mounted on the lower end of the hopper.

To prevent lateral spillage of material discharged on the belt, skirt board or plates are provided which may have lateral sealing strips that yieldably engage the upper surface of the belt. These parallel strips are spaced apart about ⅔ of the width of the belt. Provision has been made for raising and lowering the skirt plates coincident with movement of the gate so that when the gate is opened, the skirt plates are in lowered sealing position, and when the gate is closed, the skirt plate assembly is raised a desired distance above the belt. This reduces wear on the belt and on the sealing edges of the skirt plates because the belt continues to run even though material is not being charged onto it. It also reduces the load on the conveyer.

An example of the foregoing arrangement is disclosed in U.S. Pat. No. 1,925,990 issued Sept. 5, 1933, on an invention of F. A. Pampel, wherein common motion of an activating member simultaneously raises the skirt when the gate is closed and alternately lowers the skirt when the gate is opened.

The present invention comprises improvements in structures of the type just described in that the position of the skirt assembly relative to the gate is positively controlled at all times and particularly while the gate activating mechanism is only partially opened. Thus material can be metered through the gate while partially opened and at the same time the sealing members of the skirt assembly remain locked in the same position relative to the belt conveyer that they occupy when the gate is fully opened.

Another feature of the invention is the provision for causing over-travel of the gate beneath the hopper when it has passed effective closing position to enable extreme elevation of the skirt assembly after gate closing and subsequent lowering of the skirt into sealing relation with the belt prior to gate opening. To prevent a rock or other foreign object wedging between the gate and the throat of the hopper, the lower end of the opposing wall of the hopper is made of flexible material which can yield when so engaged.

BRIEF DESCRIPTION OF THE DRAWINGS

FIG. 1 is a side elevation of the loading mechanism comprising the hopper, gate, belt, skirt and interconnecting elements;

FIG. 2 is a partial section taken on the line 2—2 of FIG. 1;

FIG. 3 is a diagrammatic view showing the gate closed and skirting in fully raised position;

FIG. 4 is a view similar to FIG. 3 showing the gate and skirting as the gate starts to open;

FIG. 5 shows the gate partially open with skirting in locked down position; and

FIG. 6 is a view similar to FIGS. 3 to 5 showing the gate fully opened and the skirting in the same position as in FIG. 5.

DETAILED DESCRIPTION

Frequently belt conveyers run in tunnels which are disposed beneath a battery of hoppers arranged over different positions of the travelling belt. Because of lack of accessability to the tunnels and the restricted space within it, it is essential that the skirting be effective to prevent excessive buildup on the floor of spilled material, and also that the gate operating mechanism act reliably and accurately to control the flow of material onto the belt.

In the drawings, the base 11 represents a part which is bolted to the bin structure. From it depends the hopper 12, through which material in the bin passes prior to being deposited on the flexible belt 13 of the belt conveyer. The belt 13 assumes a trough-like cross section by virtue of troughing idlers (not shown) which support it. The bottom roll of the idler is horizontal while the two side rolls are inclined upwardly. The troughing of the belt enables it to carry more material without spilling as is well known in the art.

The hopper 12 has an inwardly sloping front wall 14 and lateral sides 15, the lower edges of the latter being arcuate to conform to the shape of the clam shaped gate 16. A plastic liner 17 is secured to the inner side of the front wall 14 by means of self tapping screws extending from outside the hopper through the wall 14. This enables the wear material to be replaced whenever necessary. Should a stone or other object wedge between the gate and the wall, the liner 17 may yield to accomodate it.

The gate 16 is hinged at 18 and its lower cut-off bottom portion or leaf 19 is cylindrical with respect to this hinge as its center. The two sides 20 of the gate 16 are secured to the lower side of the cam members 21, one on each side of the hopper. The cam members 21 have a thickened hub section and each is press fitted on an oil impregnated bushing 22 which is journalled on a pin 23 extending from a hole in the side of the hopper 12 to an outboard support 24 which is apertured to accomodate the pin. The pin 23 is restrained from end movement by the keeper bar 25 which is welded to it and is locked in position by a stud 26 extending outwardly from the support 24. A nut 27 threaded on the stud 26 when tightened prevents the keeper and the pin from being moved, but when the nut is removed, the keeper and the pin can be removed to disassemble the gate and/or replace the pin or bushing 22 if either is worn.

The sides 15 of the hopper 12 each carry a weldment or collar 28 disposed slightly below and forward of the gate hinge 18. These collars contain bushings 29 through which a pivot shaft 30 extends from one side of the hopper to the other. Keyed to the pivot shaft 30 are the cam followers 31 (one on each side), the skirt weldment 32 and the stop bar 33 which engages the center of the front wall 14 of the hopper when the skirt is in lowered position.

The stop bar carries an adjustable stop near its outer extremity which consists of the bolt 34 which extends through the bar 33 and engages the nut 35. The head 35 of bolt 34 is arranged to abut the front wall 14 of the hopper (medially thereof), when the shaft 30 is rotated to is extreme counterclockwise position, as shown in FIG. 1. This stop accurately positions the skirt 32 as will be hereinafter explained.

The cam followers 31 located on each side of the skirt assembly are rigidly keyed to the shaft 30. Each is arranged to engage a cam 21 which is welded to the gate as previously described. The cam 21 has a notch 36, the shape of which conforms to the outer end of the cam follower 31, and a dwell portion 37 of constant radius, which presses down on the follower when the stop is engaging the front wall of the hopper.

The skirt assembly 40 is an integral part with the cam followers 31. There are two such assemblies, one on each side of the gate and each has a hub-portion 41 keyed to the shaft 30. Depending from hub 41 is an arm 42 which supports a bracket 43 of substantial length, the general position of which is parallel to the belt 13 when the skirt is lowered. Bracket 43 has a number of slotted holes 44 transverse to the belt to accomodate bolts 45 which connect the bracket to the sealing strips 46. The sealing strips 46 are flexible as shown in FIG. 2 and when pressed against the belt turn inwardly to form a sealing relation of considerable overlap. The length of sealing strip 46 is somewhat greater than the gate opening to insure that material discharged through the gate cannot flow sideways over the edges of the conveyer belt. To obtain greater life, the sealing strips 46 can be reversed on the brackets 43 to use each edge of the strips as a seal.

The gate is activated by the screw jack 47 which is pinned as at 48 to a bracket 49 on the medial underside of the leaf portion of the gate 16. The other end of the jack is pinned at 50 to the base 11. The jack has limit control switches and since it travels at a uniform rate, a single remote variable flow rate control can be effected by calibrating the time the gate is energized to open, along with the resulting process rate for the material being fed.

The operation of the gate and skirt assembly will now be described. In FIG. 3, the gate is shown in its overtravel position, with the cam follower arm 31 in the notch 36 of the cam and lifting the skirt 40 to its maximum height. The stop 34 has been rotated away from engagement with the hopper.

FIG. 4 shows the gate at the point of opening, with the skirt nearing the sealing portion on the belt and the stop approaching abutment with the hopper.

Because of the nature of material such as sand, the gate may be slightly opened before any material will pass through it. Consequently the skirt need not make a complete seal until this position is reched as shown in FIG. 5. At this time the stop 34 abuts the front wall 14 of the hopper and the skirt is locked between the cam face and the abutment, with the flexible sealing skirts 46 engaging the belt 13 as shown in FIG. 2, but not being supported by the belt. This position is maintained regardless of the degree to which the gate is opened, the final gate opening position being as shown in FIG. 6.

During closing of the gate, the operation of the parts is reversed, with lifting of the skirt commencing when effective closing of the gate occurs even if there is a slight clearance remaining between the gate and the lower edge of the liner 17.

The invention having been described what is claimed is:

1. Conveyer loading equipment comprising a hopper having a forward and rear wall and lateral sides, a retractible skirt assembly pivotally mounted on said hopper with lateral side members overlapping the lateral sides of said hopper, the lower edges of said skirt assembly side members forming a seal with the conveyer to prevent spillage of material, a gate pivotally mounted on said hopper arranged to open and close, in varying degrees, the discharge end of said hopper, said gate carrying a cam member and said skirt having a cam follower mounted thereon, the arrangement being such that when the gate is moved to closing position, the cam engages the follower to lift the skirt from the conveyer and when the gate is activated prior to efective gate opening, the skirt is moved into sealing relation with the conveyer and held in such position regardless of the extent to which the gate is opened.

2. Apparatus according to claim 1 including locking means rotatable with the skirt assembly for arresting lowering movement of said assembly and cooperating with said cam member to lock the skirt in the desired sealing relation to the conveyer.

3. Apparatus according to claim 2 in which the locking means has an ajustable stop the position of which can be adjusted to more accurately position the lower skirt sealing edges with respect to the conveyer.

4. Apparatus according to claim 1 in which the lower end of the front wall of the hopper is arranged a short distance above the position of the gate when the latter reaches closing position, and a flexible member extends below the lower end of said front wall to form a closing edge, which is yieldable in case a rock or other obstruction should be wedged betwen the gate and said wall.

5. Apparatus according to claim 4 in which the flexible member is a wear-resistant liner secured to the inner side of the front wall of the hopper.

6. Apparatus according to claim 1, in which the cam has a notch engageable with the follower for lifting the follower and rotating the skirt to an elevated position, said cam having a dwell portion during which the follower is not moved while the gate is being moved from partially opened to fully opened position.

7. Apparatus according to claim 1, wherein the gate over-travels its closed position while the skirt is being elevated to its highest position, such over-travel enabling the skirt to be lowered into sealing relation with the conveyer prior to gate opening when the movement of the gate is reversed.

8. Apparatus according to claim 1 including gate activating mechanism the motion of which is controllable to position the gate in any desired partially opened position.

* * * * *